AUTOMATIC DATA REPORTING SYSTEM WITH REMOTE POWER DERIVING MEANS

Filed April 8, 1966 3 Sheets-Sheet 1

INVENTOR
G. C. PRINS
BY J. P. Kearns
ATTORNEY

Sept. 9, 1969 G. C. PRINS 3,466,395

AUTOMATIC DATA REPORTING SYSTEM WITH REMOTE POWER DERIVING MEANS

Filed April 8, 1966 3 Sheets-Sheet 2

Sept. 9, 1969 G. C. PRINS 3,466,395

AUTOMATIC DATA REPORTING SYSTEM WITH REMOTE POWER DERIVING MEANS

Filed April 8, 1966 3 Sheets-Sheet 3

United States Patent Office 3,466,395

Patented Sept. 9, 1969

3,466,395

AUTOMATIC DATA REPORTING SYSTEM WITH REMOTE POWER DERIVING MEANS

Gerard C. Prins, Long Branch, N.J., assignor to Bell Telephone Laboratories, Incorporated, New York, N.Y., a corporation of New York Filed Apr. 8, 1966, Ser. No. 541,386

Int. Cl. H04m *11/04*

U.S. Cl. 179—2 9 Claims

ABSTRACT OF THE DISCLOSURE

An automatic data alarm reporting system operates over the public dial telephone network completely independent of local power sources. Operating power is derived from the telephone central office battery at low trickle charging levels. The control circuit, responsive to an alarm signal, causes the system in sequential fashion to go off-hook, wait for and detect dial tone, outpulse the dial digits of a central data-gathering station, detect answer tone, connect a data modulator to the telephone line and return to on-hook status after a time-out interval. Repeated attempts to reach the central data-gathering station are made when no answering tone is detected and the alarm persists.

This invention relates to the unattended control of data transmission from a remote reporting station to a central data gathering station through the medium of the public switched telephone network.

The vast public switched telephone network provides easily accessible wired connections among nearly every place of residence and business in the United States. Although originally designed to handle voice communications between calling and called parties, the switched network is more and more being adapted to communication from machine to machine in the form of analog and digital data. Data, for the purposes of this specification, includes the type of intelligence carried by telegraph channels and also, with greater relevance to present-day conditions, the primarily numerical intelligence suitable for the control of, or entry into, automatic calculating and "data-processing" equipment.

The earliest applications of data handling from station to station required the intervention of a human agency in the establishing and taking down of calls between data transmitting and receiving stations. For this reason data operation has been integrated with voice operation of the switched telephone network.

It is an object of this invention to establish and take down data calls between a calling data reporting station and a called data gathering station automatically and without human intervention.

In the past human intervention has generally been required to take the calling station off-hook, recognize dial tone, dial the called station number, recognize by the response of a human agent that the called station has gone off-hook, transfer to the data mode and transmit the data. At the termination of the data call it was necessary for the called station to signal that the data has been received so that the calling station can return to the on-hook condition. The first aspect of this process to be automated was automatic call termination.

It is another object of this invention to originate calls between a calling data reporting station and a called data gathering station automatically, responsive to some reportable change of condition at the calling station.

It is still another object of this invention to perform all aspects of call origination and termination for an automatic data reporting system without human intervention over the switched telephone network.

According to this invention, an automatic data reporting system, entirely powered from the telephone line, performs the functions responsive to a customer call request (alarm condition) indication of going off-hook, detecting the dial tone condition on a ground-start telephone subscriber line, pulsing out the previously encoded number of a data gathering station, detecting a special answer tone indication that the data gathering station has gone off-hook, and transferring to the data mode. In addition, a time-out provision terminates completed calls by going on-hook in about three minutes or repeats the call attempt on uncompleted calls as long as the call request indication persists. A ringing current detector controls a test feature whereby the control circuit is made to pulse out the preset coded telephone address of the data gathering station.

The information transmitted by the data modulator from an unattended location may advantageously include high steam pressures, low fuel levels, power failures or meter readings.

A feature of this invention is that power for operation of the preset dial, answer detector, ring detector, timer and data modulator are derived from telephone line power. No local batteries or rectified alternating-current power is required.

A complete understanding and full appreciation of these and other objects and features of this invention may be had from a consideration of the following detailed description and the drawing in which.

Figure 1:
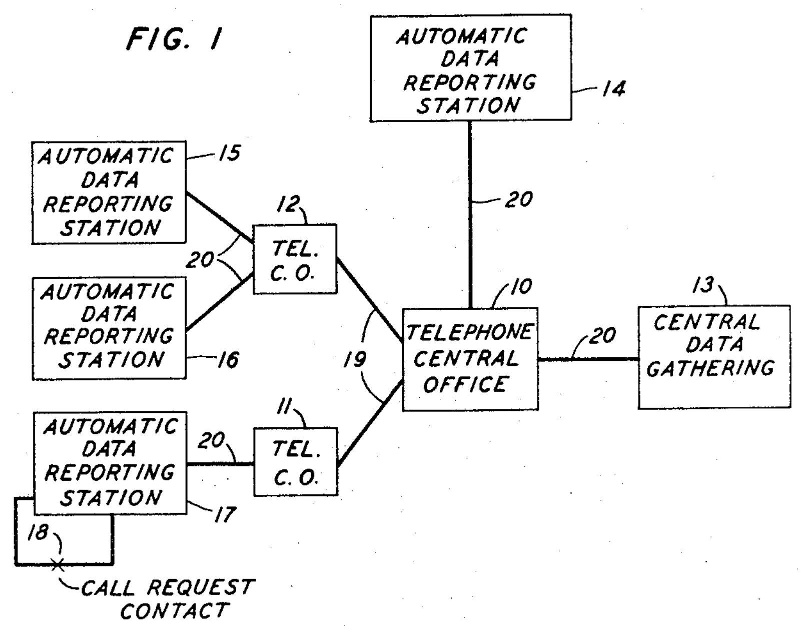
FIG. 1 is a generalized diagram of an automatic data reporting system operable over the public switched telephone network.

FIG. 1 depicts a telephone switching network in which a plurality of representative automatic data reporting stations 14, 15, 16 and 17 can communicate alarm messages to a central data-gathering station 13 through one or more telephone central offices, such as those designated 10, 11 and 12. Lines designated 20 are telephone subscriber line pairs outgoing from telephone central offices, and lines 19 are exchange trunk or toll lines. According to this invention, no modifications are required at the telephone central offices, exchange trunks or subscriber lines.

Automatic data reporting station 14 is shown as connecting to the same central office as central data gathering station 13. Therefore, a call between stations 13 and 14 would be a local call. Reporting stations 15, 16 and 17 have access to central gathering station 13 through more than one telephone central office. Therefore, calls originated by these reporting stations may be toll calls involving the use of direct-distance dialing. The call-request make contact 18 indicated at station 17 is typical of all the reporting stations and is used to initiate an automatic reporting call.

Figure 2:
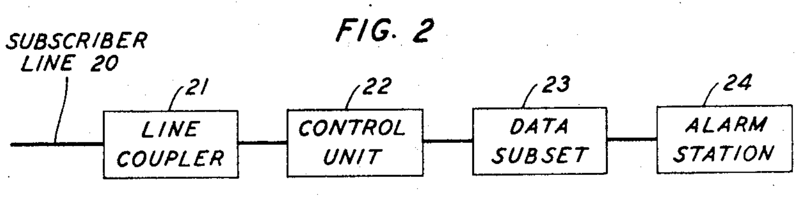
FIG. 2 is a generalized block diagram of the automatic data reporting apparatus found on a customer's premises.

FIG. 2 illustrates the general arrangement of an automatic data reporting station as a block diagram. To the subscriber line 20 is connected a line coupler module which protects the circuits of the control unit 22 and data subscriber's set 23 from polarity reversals on the telephone line and also limits the range of line currents. Control unit 22 is the heart of the invention and functions to supervise the sequence of events in presenting on- and off-hook appearances to the telephone subscriber's line while originating calls responsive to an alarm condition. Data subscriber's set 23 may be a parallel or serial modulator for digital data transmission of a type well known in the art. Alarm station 24 may be any type of monitoring device for pumps, fuel levels, power availability and the like. It may be capable of generating any type of digital message for reporting the status of various control entities on a customer's premises.

Figure 3:
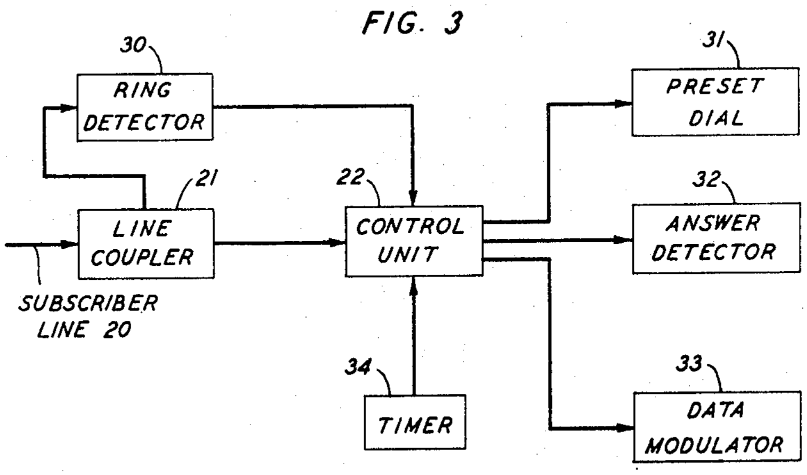
FIG. 3 is a functional block diagram of the control circuits for an automatic data reporting station according to this invention.

FIG. 3 is a functional block diagram of an illustrative automatic data reporting station according to this invention. The automatic data reporting station is intended for use at any remote, unattended location connected to a telephone subscriber line 20. Its functions are centered around a control unit 22, which is connected to line 20 through a line coupler 21. Responsive to customer closure of an external call request contact (not shown) control unit 22 requests dial tone on the ground-start telephone line 20 by presenting an off-hook appearance. At the same time timer 34 is started. Timer 34 illustratively has a time-out period of about three minutes. During this time a ground on the tip lead of subscriber line 20 accompanies dial tone and causes control unit 22 to connect preset dial 31 to line 20. The preset number of the central data gathering station is pulsed out over line 20 through control unit 22 and coupler 21. On completion of dialing control unit 22 drops dial 31 and connects answer detector 32 to line 20 and waits for the distinctive answer-tone frequency of 2025 cycles. If answer tone is detected before timer 34 has run out, control unit 22 drops detector 32 and connects data modulator 32 to line 20.

If answer tone is not detected within the time-out period, control unit 22 presents an on-hook appearance to line 20 when the time-out period expires. If, in addition, the call request is still standing, control unit 22 initiates another call attempt after a short waiting period. Power interruption by the telephone central office will also cause control unit 22 to go on-hook.

Ring detector 30, connected to line 20 through line coupler 21 responds to ringing current to operate a relay paralleling the call-request contact. Control unit 22 then goes through the call attempt procedure in the same manner as for customer closure of the call-request contact for test purposes.

A number of relays in control unit 22 are operated from capacitors trickle-charged over line 20 from central office battery. Power for successive operation of dial 31, detector 32 and modulator 33 is derived in control unit 22 across a varistor-shunted capacitor in series between the tip and ring conductors of line 20.

Figure 4:
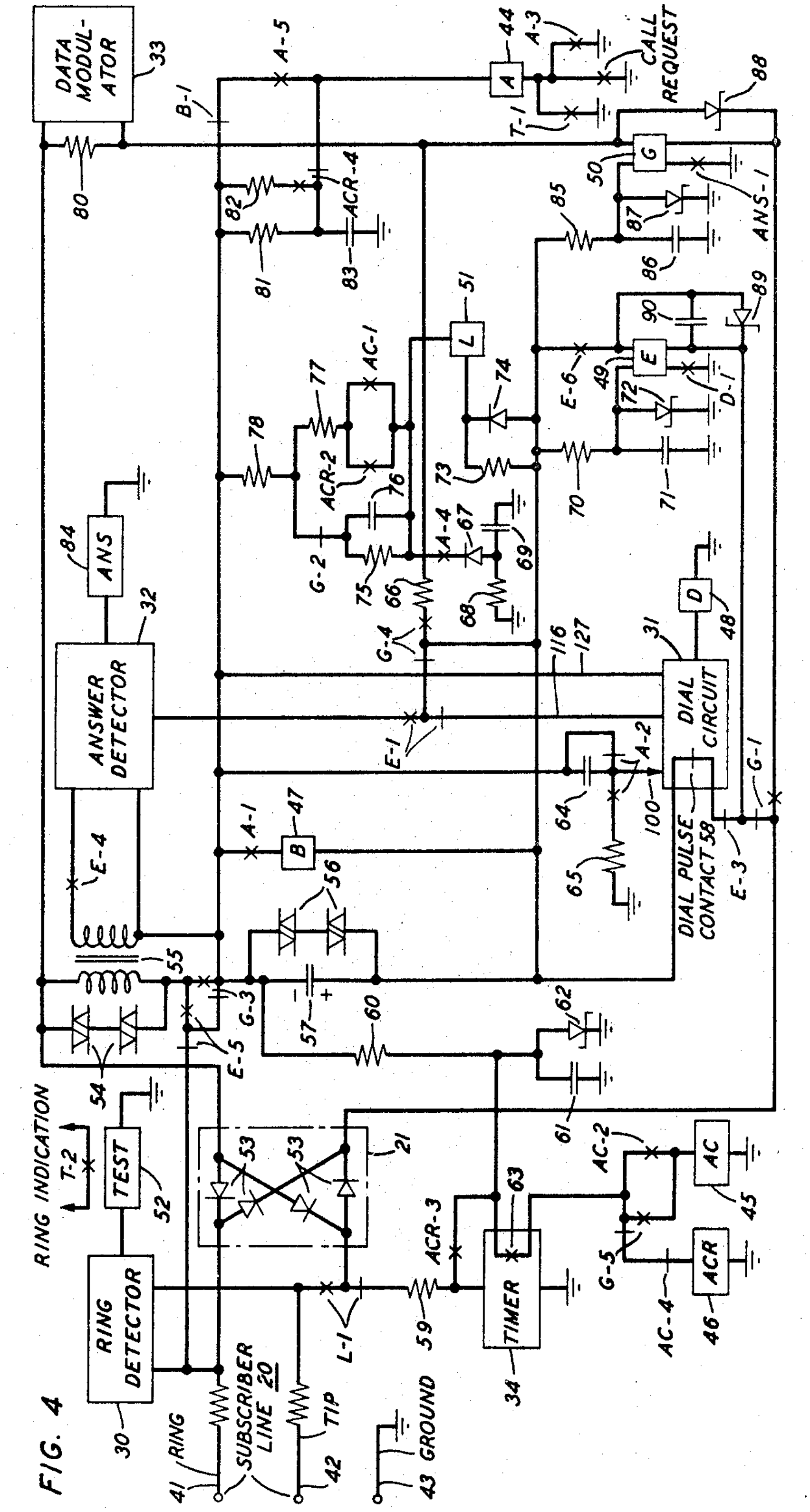
FIG. 4 is a complete schematic diagram of the control circuits of an automatic data reporting station according to this invention.

Details of a practical control unit are shown in FIG. 4. The control unit proper comprises dial tone request relay A, dial-tone detection relay B, end-of-dial relay D, answer-tone mode relay E, answer-tone detected relay ANS, data mode relay G, abandon-call relay AC, abandon-call-and-relay ACR, line-latching relay L, trickle-charged capacitors 83, 57, 64, 71, 86, 61 and 69 associated respectively with the previously listed relays, and associated resistors and diodes. Capacitors 61, 71, 83 and 86 are trickle charged from telephone line 20, as will be more fully described below.

All relay contacts in FIG. 4 are indicated schematically in the well-known functional detached form to simplify the drawing. The contacts are identified by the letter designation assigned to the relay core on which they are physically located. A perpendicular stroke on a conductor represents a break contact (associated relay released) and a cross, a make contact (associated relay operated).

At the left of FIG. 4 subscriber line 20 is broken down into the conventional tip and ring conductors 42 and 41 and an actual ground 43. Resistors as shown adjacent the terminals of these leads are adjusted during installation to limit current according to the distance of the subscriber from the central office. Normally ring lead 41 is 48 volts negative with respect to ground 43 and tip lead 42 is floating.

In the on-hook condition capacitor 83 on the right of FIG. 4 is trickle charged between ring lead 41 and ground 43 through resistor 81 to a level sufficiently high to operate the A relay through the break portions of transfer contacts E–5 and G–3 of the released E and G relays. The ungrounded terminal of capacitor 83 is connected to the upper terminal of A relay 44 through the break portion of transfer contact ACR–4. Upon occurrence of an alarm condition a customer call-request make contact in the lower right of FIG. 4 is closed to ground. This contact is connected to the other terminal of relay A and therefore allows capacitor 83 to discharge and operate relay A.

Upon operating, relay A provides itself with a holding path through its make-contact A–3, paralleling the call-request contact, and contact A–5 which shunts resistor 81 through break-contact B–1. Relay A is now connected directly to the ring lead and draws a much larger current than that due to the trickle charging of capacitor 83.

The telephone central office detects the increased current drain on the ring lead and reacts by grounding the tip lead, which grounding corresponds to the presence of dial tone on the line.

Just prior to the closure of relay A, a small current flowing from ring lead 41 through break-contacts E–5 and G–3, varistors 56, dial-pulse contact 58, break-contact E–3 and break portion of transfer contact G–1, lower diode 53 in polarity bridge 21, break-contact L–1 and resistor 59 resets and holds timer 34 inoperative. Timer 34 remains inoperative until magnetic latching relay L(51) operates as explained below. After a preset time of 2½ to 3 minutes contact 63 therein closes for a purpose described hereinafter.

Upon the closure of make-contact A–4 a negative current pulse from the ring lead charges capacitor 69 through L relay 51 by a path including the break portions of transfer contacts E–5 and G–3, capacitor 57 shunted by varistors 56, resistor 73, coil of relay L, make-contact A–4, negatively poled diode 67 and resistor 68. Relay L is advantageously of the magnetic latching type which will operate on a small pulse of current and pull in and hold by magnetic means. The make-portion of contact L–1 now closes tip lead 42 to polarity guard rectifier bridge 21, which is the major part of the line coupler. Bridge 21 includes four diodes 53 poled as shown. The purpose of the bridge is to assure the correct polarity of the power supplied to transistors in the answer detector and modulator. Some telephone switching systems provide a battery reversal to indicate that the called party has gone off-hook in answering a call.

Now that contact L–1 has transferred, a charging path for capacitor 57 is provided over a path beginning at ring terminal 41 and including break portions of transfer contacts E–5 and G–3, capacitor 57, dial pulsing contact 58 in dial circuit 31, break-contact E–3, break portion of transfer contact G–1, lower rectifier 53 in bridge 21, make portion of contact L–1 and tip terminal 42. Relay B(47) is shunted across capacitor 57 by the operation of make-contact A–1. The operation of relay B upon grounding of the tip terminal 42 releases relay A by opening its break-contact B–1 and trips central office dial tone. The release of relay A in turn releases relay B by way of contact A–1. The current flowing over the above-described path, through varistors 56 and holding capacitor 57 fully charged, is sufficient to present an off-hook appearance to the telephone central office.

Relay A includes another transfer contact A–2 for control of dial circuit 31. When relay A operated responsive to a call request, the make portion of contact A–2 connected dial-start lead 100 to ground through resistor 65, and removed a shunt around capacitor 64. Positive current is thus applied to lead 100. This current has the effect of resetting a counter in dial circuit 31, as will be explained more fully below. When relay A releases after the dial tone condition has been detected by relay B, the break portion of contact A–2 discharges capacitor 64 and the full negative potential of the ring lead is available to dial circuit 31 as a start-dial signal. Capacitor 64 smooths out the effect of possible contact bounce in the operation of contacts A–1.

Dial circuit 31 is shown in more detail in FIG. 5 and will now be described. The preset dial circuit is entirely electronic and comprises a matrix or grid 125 of horizontal and vertical conductors with selectable cross-point connections, a three or more stage binary counter 101–103, a series of gates 110, a shift register with stages 105, a monopulser 104, an astable multivibrator 120, a clamp circuit 121 and a pulsing circuit 123.

The binary counter is shown illustratively with three cascade bistable stages 101, 102 and 103. Each stage has set and reset inputs and corresponding "1" and "0" complementary outputs in conventional fashion. The "0" outputs of stages 101 and 102 are cascaded respectively with the set inputs of stages 102 and 103. Thus, the outputs of the several stages can successively indicate in binary form any digit from zero through eight in well known fashion. The respective outputs of the counter stages are connected to a plurality of eight NAND gates 110, of which is shown in detail in FIG. 5, is a logical arrangement so that the gates are turned on successively in top to bottom order.

Each gate includes a transistor 114, shown of the n-p-n type, collector and emitter electrode biasing means, a plurality of buffer resistors 111, 112 and 113 at the base electrode, and a diode 118 between the collector electrode and an output terminal. When all inputs on buffer resistors 111 through 113 are at the potential of the emitter, transistor 114 will not conduct. The collector electrode is positive at this time and diode 118 is therefore conducting. If one or more inputs to resistors 111 through 113 is positive with respect to the emitter potential, transistor 114 will conduct. Its collector potential then becomes negative and diode 118 is blocked. The outputs of counter stages are on when positive. Thus, the top gate is on and diode 118 is conducting only when counter stage 101 has a negative "1" output and stages 102 and 103 have negative "0" outputs. This represents the first count. Resistor 117 is higher in resistance value than any of resistors 111 through 113 and aids in establishing the proper gate decision or threshold level. The inputs to the remaining NAND gates are taken three-at-a-time from the outputs of the counter stages in a logical manner according to numerical binary sequence through cable 124 so that these gates are enabled seriatim from top to bottom as the counter advances. The outputs of gates 110 successively enable horizontal conductors D1 through D8 of grid 125. The designation "D" represents digits of a called telephone number.

The vertical conductors of grid 125 are designated N1 through N10 and EON. Conductors N1 through N10 are connected to separate stages 105 of a shift register. The leftmost stage is shown enlarged as a bistable flip-flop 128 in conventional form with a two-input AND-gate 129 on the set lead as representative of all shift-register stages. A positive set input causes a significant "1" output, and a positive reset input, a significant "0" output. All stages are connected in tandem, "1" output to set input by way of an AND-gate, such as that designated 129. Advance inputs on the other input of the associated AND-gate cause a movement to the left of significant "1" outputs. A reset lead for all stages extends to start-dial control lead 100, as shown in FIG. 5.

Grid 125 is arranged so that any of its crosspoints may be interconnected to encode a particular called number, that of the central data gathering station for example. Heavy dots on the grid indicate such interconnections. It is seen that dot 126 encodes the digit "9" as the first digit. The remaining digits are encoded in an obvious manner as shown by the other dots. The number shown in FIG. 5 is 949–3770. The rightmost vertical conductor EON (end of number) is not connected to shift register 105.

Flip-flop 120 is constructed to be astable and unsymmetrical. Its output is a rectangular wave having a 61 percent on-time and 39 percent off-time at 10 pulses per second as is required by dial pulse recognition equipment in a telephone central office. The "1" output of multivibrator 120 operates to advance shift register stages 105 and also to turn on pulsing circuit 123. The latter circuit may advantageously be a transistor switch operating as a normally closed pulsing contact, corresponding to normally closed contact 58 in FIG. 4.

A clamping circuit 121 supplies negative or positive potentials from sources 127 and 116 to multivibrator 120 according to the state of buffer or OR-gate 122. Source 127 corresponds to the upper terminal of capacitor 57 in FIG. 4. Source 116 corresponds to the lower terminal of capacitor 57 in FIG. 4 by way of the break portions of contacts E–1 and G–4.

The leftmost stage of shift register 105 controls monopulser 104, which is conventional and normally has a significant "0" output. However, when the shift-register output turns on monopulser 104, counter 101–103 is advanced and multivibrator 120 is clamped through OR-gate 122.

Dial circuit 31 has no power until after the L relay has operated and capacitor 57 has become charged as previously explained. While relay A is operating, multivibrator 120 is in clamp due to the positive voltage on the start dial lead 100. This same positive voltage sets counter stage 101 to the "1" state and resets counter stages 102 and 103 to the "0" state. Thus, horizontal grid conductor D1 is positive and the rightmost shift register stage is set because of the connection at crosspoint 126, encoding the digit "9". As soon as relay A releases, the clamp on multivibrator 120 is removed. The output of multivibrator opens and closes the pulsing circuit accordingly and also advances shift-register 105. At the ninth pulse monopulser 104 turns on, advances counter 101 and reclamps multivibrator 120. Now the second digit encoded as "4" on horizontal conductor D2 sets the shift-register stage four from the left and multivibrator cycles four times and is clamped again by monopulser 104. This sequence continues until the EON vertical conductor goes positive on the eighth digit.

For the digit "0" ten pulses are emitted from the pulsing circuit when vertical conductor N10 is enabled in an obvious manner.

When the EON conductor goes positive, clamp 121 operates through the gate 122 to stop multivibrator 120 and also to operate relay D in FIG. 4.

Figure 5:
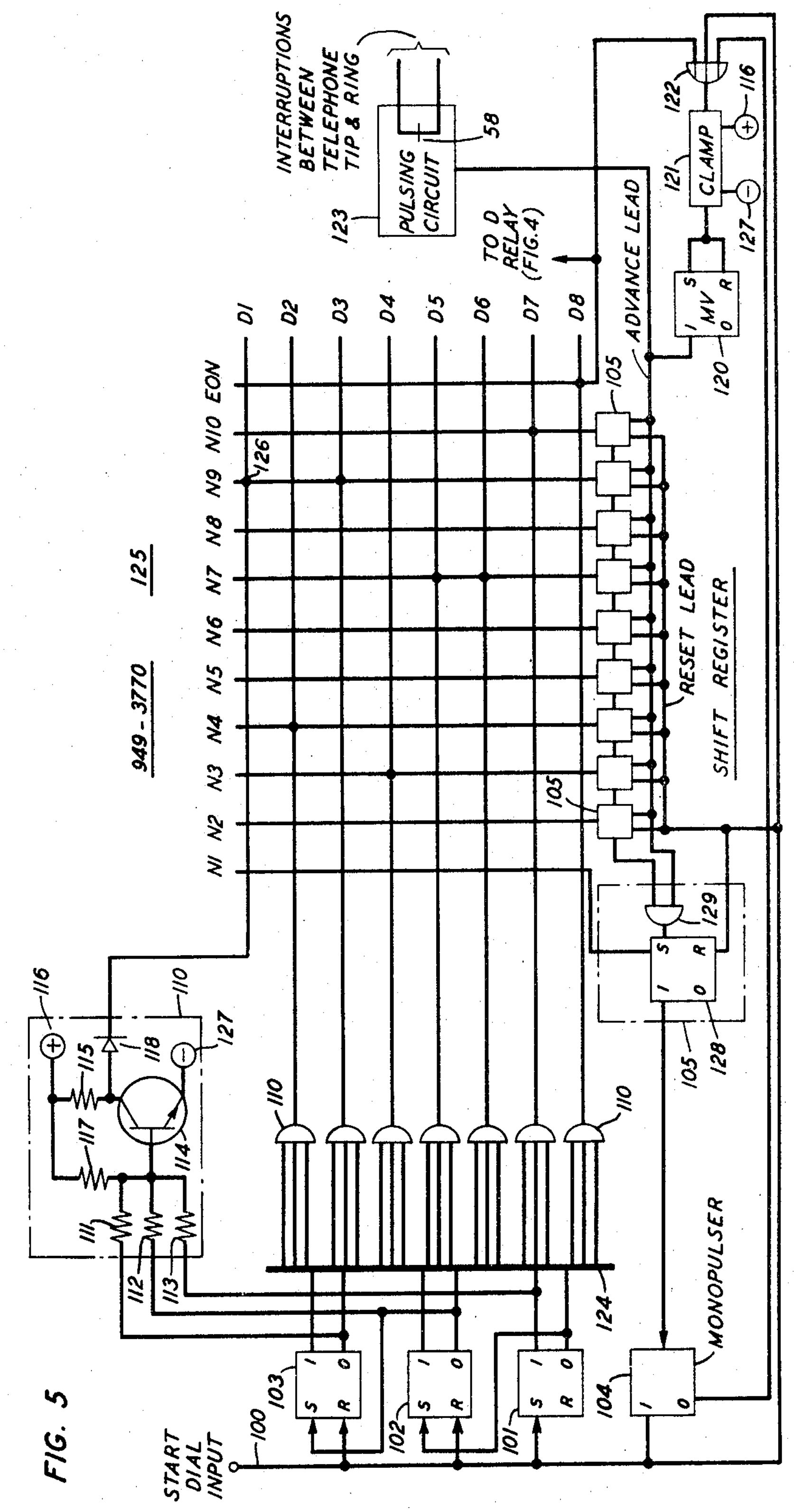
FIG. 5 is a block diagram of an illustrative embodiment of a preset dial circuit useful in the practice of this invention.

The dial pulse circuit of FIG. 5 can be expanded in an obvious manner by adding another counter stage to handle direct-distance dialing codes.

Dial pulse circuit 31 receives operating power at about 3.5 volts developed across capacitor 57 in FIG. 4 by virtue of a permanent connection (lead 127) to the negative upper terminal of this capacitor as shown, and to the positive terminal of this capacitor by way of the break portions of transfer contacts E–1 and G–4 (lead 116).

Operation of relay D(48) on FIG. 4 at the completion of dial pulsing operates relay E(49) by closing its contact D–1 to ground. Capacitor 71, paralleled by Zener diode 72, was trickle charged through resistor 70 from the ring lead 41 over an obvious path. On operation of relay D capacitor 71 discharges through one winding of relay E. Relay E provides a holding path for itself through its make-contact E–6 on its secondary winding to the positive side of capacitor 57 and through the break portion of contact G–1, the polarity bridge and the make portion of contact L–1 to tip lead 42. The principal function of relay E is to enable answer detector 32 by transferring the 3.5 volt potential across capacitor 57 to answer detector 32. This is done through the make portion of its transfer contact E–1. Dial circuit 31 is now out of operation. At the same time, break-contact E–3 opens and only relay E is connected across the tip and ring leads.

Answer detector 32 is coupled in the path between ring lead 41 and tip lead 42 by means of transformer 55, which is placed in series with polarity bridge 21 by operation of the make portion of contact E–5. This path includes make portion of transfer contact E–5, break portion of transfer contact G–3, varistors 56, make-contact E–6, holding coil of relay E and break portion of transfer contact G–1. The primary of transformer 55 is shunted by varistors 54 to protect against possible lightning induced voltage transients. Zener diode 89 maintains the proper direct voltage drop across the holding coil of relay E. Capacitor 90 holds relay E operated during possible brief interruptions of telephone line power. The secondary winding of transformer 55 can be coupled to the input of answer detector 32 through make-contact E–4.

Answer detector 32 is also supplied with 3.5 volts of power developed across capacitor 57 through the make portion of transfer contact E–1, as previously mentioned. Answer detector 32 advantageously comprises a transistorized tuned amplifier-limiter with low power drain. It is tuned to respond to a 2025-cycle tone generated at the central data gathering station when it goes off-hook. When answer tone of the proper minimum duration is received, ANS relay 84 operates.

The operation of the ANS relay closes, through its make-contact ANS–1, the lower terminal of the operating winding of relay G to ground. Previously capacitor 86 had been trickle charged from the positive terminal of capacitor 57 through resistor 85 to a level determined by shunting Zener diode 87. Capacitor 86 now discharges through relay G to operate it. Relay G, in operating, provides a locking path for itself through its holding winding over a circuit which may be traced from ring lead 41 through polarity bridge 21, data modulator 33 shunted by resistor 80, holding coil of relay G shunted by Zener diode 88, make portion of transfer contact G–1, and polarity bridge 21 to tip lead 42. This path is partially shunted by a path through the primary winding of transformer 55, capacitor 57 and varistors 56, make portion of transfer contact G–4 and resistor 66. This second path functions to maintain the charge on capacitor 57. Resistor 66, transformer 55 and resistor 80 form the proper impedance loading for modulator 33. The opening of the break portion of transfer contact G–1 releases relay E. The closing of the make portion of contact G–4 removes power from answer detector 32.

An additional contact on relay G (not shown) may be employed to signal the customer's alarm equipment that the system has gone into the data mode. The customer can now transmit any prearranged digital message desired within the time-out period provided by timer 34.

The sequential transfer of direct-current power among dial circuit 31, answer detector 32 and data modulator 33 minimizes the load on the subscriber line 20.

If timer 34 times out after relay G has operated, capacitor 61 will discharge through timer make-contact 63, make portion of transfer contact G–5 and the operating coil of AC (Abandon Call) relay 45 to ground. Capacitor 61 has been previously trickle charged from the negative terminal of capacitor 57 through resistor 60 to the level determined by Zener diode 62 (about −27 volts). In operating, relay AC locks itself through its contact AC–2 and timer contact 63 to capacitor 61. Through its contact AC–1 relay AC provides a path from ring terminal 41 through resistors 77 and 78 to the upper terminal of latching relay L. A resultant negative impulse unlatches relay L, which then opens the make portion of its contact L–1 to tip terminal 42 and terminates the call. The complete circuit path through relay L can be traced from ring terminal 41, polarity bridge 21, primary winding of transformer 55, make portion of transfer contact G–3, resistors 78 and 77, make-contact AC–1, relay L, diode 74, make portion of transfer contact G–4, resistor 66, holding coil of relay G, make portion of transfer contact G–1, polarity bridge 21, and make portion of transfer contact L–1 to tip terminal 42. Break-contact AC–4 prevents operation of relay ACR in the event relay G should inadvertently release.

If timer 34 times out before answer tone is detected, relay G will not have operated and ACR (Abandon Call and Retry) relay 46 will operate in place of relay AC from the discharge of capacitor 61 through the break portion of transfer contact G–5 and break-contact AC–4. The closing of the make portion of transfer contact ACR–4 will rapidly recharge capacitor 83 through resistor 82, which is preferably much smaller than resistor 81 through which capacitor 83 is normally trickle charged. This is in preparation for a reoperation of relay A, provided the call request contact is still closed. The closing of make-contact ACR–2 performs the same function in causing the unlatching of relay L as did the operation of contact AC–1, previously described. The closing of make-contact ACR–3 finally resets timer 34. The control circuit of FIG. 4 goes on-hook for about one second, as determined by the time that the current discharging from capacitor 61 can keep relay ACR operated as previously described and repeats the calling procedure, provided the call request contact has not opened.

The control circuit of FIG. 4 can be placed in the on-hook condition during the transmission of data, if the central data gathering station should for some reason transfer to the on-hook condition. Some types of telephone exchanges are provided with a time-out feature operative in response to the called party going on-hook to interrupt the line current toward the calling party. To handle this contingency relay G includes a break-contact G–2 in the circuit of latching relay L. Before relay G operated capacitor 76 had acquired a charge which reduced the voltage across latching relay L and insulated it from releasing on minor fluctuations in telephone line power. When relay G operates, its contact G–2 opens and capacitor 76 discharges harmlessly through resistor 75. The release of relay G as the result of a current interruption due to the termination of the call by the called station causes a current pulse to flow through relay L in the same manner as described above by the operation of the AC or ACR relays. Relay L releases and the control circuit goes on-hook even though timer 34 is prevented from timing out.

A test feature is provided in connection with ring detector 30, which operates test relay 52 from a capacitor charging on 20-cycle ringing current. The central data gathering station can ring up the automatic data reporting station in the usual manner. Relay T operates in about ten seconds after ringing ceases and gives an indication to the customer equipment through contact T–2. Through make-contact T–1, paralleling the customer call-request contact, relay A is operated as described before.

While this remotely located automatic data reporting system, entirely operated from telephone line power without local storage batteries, has been described in terms of a specific illustrative embodiment, it will be understood that numerous modifications are possible within the skill of the art without departing from the spirit of the invention and within the scope of the appended claims.

What is claimed is:

1. An automatic data reporting system comprising a central data-gathering station having an assigned dial telephone number, a plurality of subscriber data reporting stations, each including a preset dial, an answer-tone detector, timing means and a data modulator,
a telephone central office,
subscriber lines interconnecting said central data-gathering station and said data reporting stations with said telephone central office, and
control means at each of said data reporting stations deriving power exclusively from said telephone central office over a subscriber line and responsive to an alarm indication distributing said derived power sequentially to outpulse the assigned telephone number of said data-gathering station from said preset dialer, to detect an answering tone therefrom, to transmit a data message from said data modulator and to terminate each data call after said timing means times out.

2. In combination with a telephone central office, a subscriber's telephone line, a subscriber's data set and a trouble alarm station, a control circuit on the subscriber's premises comprising
means responsive to an alarm indication by said alarm station for presenting an off-hook appearance to said central office,
dial-pulsing means for outpulsing the preassigned dialing digits of a data-gathering station,
means responsive to grounding of one conductor of said subscriber's line as a dial-tone indication by said central office for activating said dial-pulsing means,
means detecting a particular answering tone generated by said data-gathering station,
means responsive to completion of dial pulsing for disconnecting said dial-pulsing means from and connecting said answer-tone detecting means to said subscriber's line,
means responsive to receipt of said answering tone by said detecting means for disconnecting said answer-tone detecting means from and connecting said data set to said subscriber's line,
timer means for returning said control circuit to an on-hook appearance after a preselected time interval, and
means deriving power for the sequential operation of all said means from said central office by way of said subscriber's telephone line.

3. The combination as set forth in claim 2 in which said means for presenting an off-hook appearance to said central office comprises
a first two-terminal relay, one terminal being grounded by said alarm indication,
a capacitor connected between the other terminal of said first relay and ground,
means including a resistor for charging said capacitor from one conductor of said subscriber's line,
the potential developed across said capacitor being sufficient to operate said first relay,
a second relay of the magnetic latching type having a make contact in series with the other conductor of said subscriber's line and said control circuit,
means operating said second relay responsive to operation of said first relay, and
a third relay connected by operation of said first relay directly across the two conductors of said subscriber's line for discontinuing the dial-tone request to said central office.

4. The combination set forth in claim 2 in which said dial-pulsing means comprises a matrix of horizontal and vertical conductors encoding by selectable crosspoint connections the successive dialing digits of a central data-gathering station,
a multistage binary counter,
a plurality of coincidence gates interconnecting selected outputs of said binary counter and said horizontal conductors to energize the horizontal conductors of said matrix in serial order,
a multistage shift register having each stage connected to a different one of said vertical conductors,
a free-running multivibrator advancing said shift register at a dial-pulsing rate,
a monostable multivibrator operable from the last stage of said shift register to advance the count of said binary counter to energize the next horizontal conductor,
a clamping circuit for enabling and disabling said free-running multivibrator,
means responsive to said monostable multivibrator for placing said clamping circuit in the disabling state between dial digits,
a pulsing circuit including a normally closed switch operable responsive to changes of state of said free-running multivibrator,
an input circuit responsive to a start dial signal from said control circuit for setting said binary counter on its first count position thereby to enable the first of said horizontal conductors and for operating said clamp circuit to the enabling state, and
a connection from the last vertical conductor of said matrix as an end-of-number indication to restore said clamp circuit to the disabling state after outpulsing the last dial digit.

5. The combination as set forth in claim 2 in which said means for activating said dial-pulsing means comprises
a first relay operated responsive to an alarm indication between one conductor of said subscriber's line and ground,
a second relay connected to the one conductor of said subscriber's line by the operation of said first relay and having a break contact in a holding path for said first relay,
another connection from said second relay to the other conductor of said subscriber's line, said second relay thus being operated by the grounding of said other conductor by said telephone central office as a dial-tone indication thus to release said first relay, and
a transfer contact on said first relay closing said dial-pulsing means to said one subscriber's line conductor upon the release thereof as a start-dial signal.

6. The combination as set forth in claim 2 in which said means for connecting said answer-tone detecting means to said subscriber's line comprises
a transformer having a primary winding in series relationship with the two conductors of said subscriber's line and a secondary winding connectable to said answer-tone detecting means,
a capacitor trickle charged from one conductor of said subscriber's line,
a further relay operable from the discharge of said capacitor upon the completion of dial pulsing, and
transfer contacts on said further relay releasing said dial-pulsing means from and connecting said answer-tone detecting means to said subscriber's line.

7. The combination as set forth in claim 2 in which said means for connecting said data set to said subscriber's line comprises
a further capacitor trickle charged from one conductor of said subscriber's line,
an additional relay operable from the discharge of said further capacitor upon detection of said answering tone, and
transfer contacts on said additional relay releasing said answer-tone detecting means from and connecting said data set across both conductors of said subscriber's line.

8. The combination as set forth in claim 2 with power supply means for said dial-pulsing means, answer-tone detecting means and said data set comprising
a four-diode rectifier bridge connectable to said subscriber's line responsive to an alarm indication by said alarm station, a capacitor connectable to charge from said subscriber's line through said rectifier bridge, and a plurality of varistor elements shunting said capacitor to maintain a constant potential level thereacross.

9. The combination as set forth in claim 2 and a test circuit for said control circuit comprising detecting means responsive to low frequency ringing current incoming on said subscriber's line, a test relay operable by said detecting means, and contacts on said relay simulating an alarm indication whereby said control circuit is caused to operate in the same manner as for such alarm indication.

References Cited

UNITED STATES PATENTS

| | | | |
|---|---|---|---|
| 2,780,671 | 2/1957 | Thery | 179—5 |
| 3,301,957 | 1/1967 | Germond et al. | 179—2 X |
| 3,327,060 | 6/1967 | Hogan | 179—5 |

ROBERT L. GRIFFIN, Primary Examiner

WILLIAM S. FROMMER, Assistant Examiner

U.S. Cl. X.R.

179—5